(12) United States Patent
Tesh

(10) Patent No.: US 6,928,771 B1
(45) Date of Patent: Aug. 16, 2005

(54) INSECT MONITOR AND METHOD

(76) Inventor: William A. Tesh, 7670 Deboe Rd., Summerfield, NC (US) 27358

( * ) Notice: Subject to any disclaimer, the term of this patent is extended or adjusted under 35 U.S.C. 154(b) by 0 days.

(21) Appl. No.: 10/780,135

(22) Filed: Feb. 17, 2004

Related U.S. Application Data

(63) Continuation of application No. 10/373,370, filed on Feb. 24, 2003, now abandoned, which is a continuation of application No. 10/253,726, filed on Sep. 24, 2002, now abandoned, which is a continuation of application No. 10/135,561, filed on Apr. 30, 2002, now abandoned.

(51) Int. Cl.$^7$ .............................................. A01M 1/20
(52) U.S. Cl. .................................................... 43/132.1
(58) Field of Search ........................ 43/124, 131, 132.1

(56) References Cited

U.S. PATENT DOCUMENTS

| | | | |
|---|---|---|---|
| 4,395,842 A * | 8/1983 | Margulies | 43/114 |
| 4,823,506 A * | 4/1989 | Demarest et al. | 43/131 |
| 5,040,327 A * | 8/1991 | Stack et al. | 43/131 |
| 5,815,090 A * | 9/1998 | Su | 340/870.16 |
| 5,877,422 A * | 3/1999 | Otomo | 73/587 |
| 6,023,879 A * | 2/2000 | Katz et al. | 43/131 |
| 6,178,834 B1 * | 1/2001 | Cates | 73/865.8 |
| 6,195,934 B1 * | 3/2001 | Megargle et al. | 43/131 |
| 6,370,812 B1 * | 4/2002 | Burns et al. | 43/124 |
| 6,397,516 B1 * | 6/2002 | Su | 43/124 |

* cited by examiner

Primary Examiner—Teri Pham Luu
Assistant Examiner—Jordan Lofdahl

(57) ABSTRACT

An invention is disclosed whereby an assurance agreement with a building owner is made for annual or other periodic insect inspections. Monitors are placed within the treatment zone and annual or other required inspections are thereafter made to determine insect activity and to evaluate termiticide effectiveness. Appropriate corrective action as necessary is taken to protect the building from damage caused by insects such as termites.

11 Claims, 5 Drawing Sheets

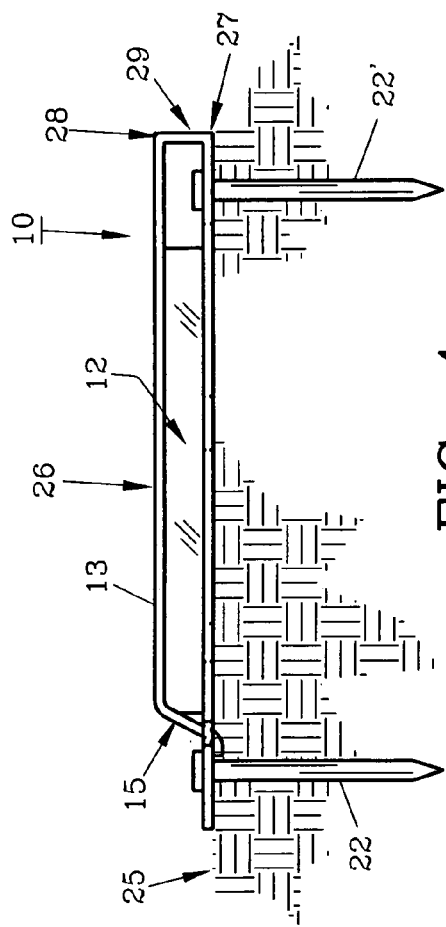
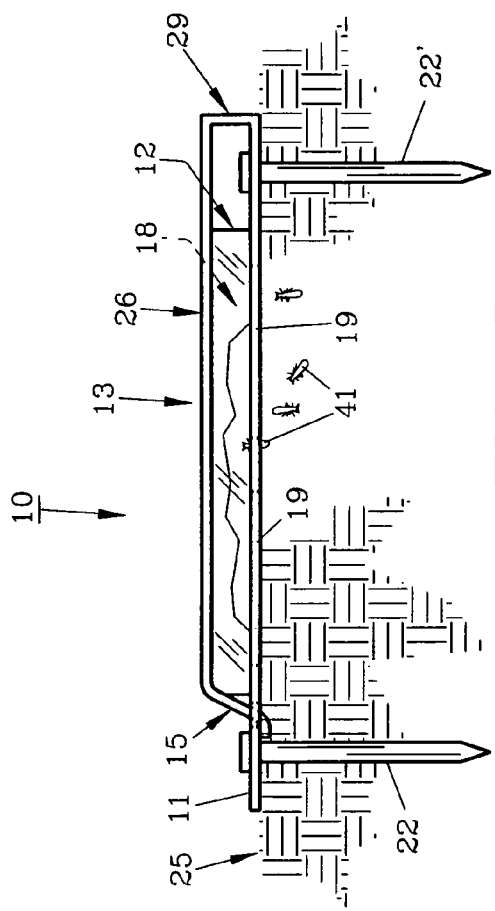

INSECT MONITOR AND METHOD

This is a continuation of application Ser. No. 10/373,370 filed 24 Feb. 2003, now abandoned which was a continuation of application Ser. No. 10/253,726 filed 24 Sep. 2002, now abandoned which was a continuation-in-part of application Ser. No. 10/135,561 filed 30 Apr. 2002, also now abandoned.

FIELD OF THE INVENTION

The invention herein pertains to protecting buildings from insect damage and particularly pertains to the monitoring and protection to prevent termite damage under an assurance program provided to a building owner by a Pest Management Professional (PMP).

DESCRIPTION OF THE PRIOR ART AND OBJECTIVES OF THE INVENTION

Millions of dollars of damage are caused each year by termite and other insect infestations in houses and other buildings. PMPs visually inspect building foundations, floor joists and other wooden structural elements in addition to applying environmentally dangerous insecticides or toxins, which form a treatment zone along the building foundation. In recent years termite "stations" have been employed which consist of cellulose material placed in termite accessible containers buried around buildings several feet from the building foundation on the exterior thereof. A PMP then inspects the termite stations, generally on a monthly or quarterly basis to determine if the termite stations demonstrate insect activity. As these stations are spaced several feet from the building, false positives often result and the prescribed treatments are often an unnecessary expense to the building owner. In addition, such termite stations are frequently damaged with lawn mowing or other yard equipment as workers cannot readily detect buried termite stations.

Thus, with the problems and disadvantages of conventional insect monitoring devices and methods, the present invention was conceived and one of its objectives is to provide an insect monitor which is placed above ground in the treatment zone for easy placement, viewing and inspection.

It is still another objective of the present invention to provide a subterranean termite monitor which is simple to make and install.

It is yet another objective of the present invention to provide a termite monitor which includes a polymeric base, a wafer case, a cellulose wafer and an opaque flap to protect the wafer from the deteriorating effect of the sun and rain.

It is yet another objective of the present invention to provide an insect monitoring device which can be easily installed.

It is a further objective of the present invention to provide a method for monitoring insect activity proximate a house or other building which includes contracting with a building owner and placing a monitor on the ground surface, in the termiticide treatment zone (within approximately 6 inches (15.24 cm) of the foundation) of the building for regular visual inspections for determining the current efficiency of the termiticide treatment.

Various other objectives and advantages of the present invention will become apparent to those skilled in the art as a more detailed description is set forth below.

SUMMARY OF THE INVENTION

The aforesaid and other objectives are realized by providing contracted termite monitoring assurance to building owners. A subterranean termite monitor having a base formed from a flat, planar strip of thin polyvinyl chloride material is used in the monitoring process. The base has feeding ports to allow termite entry to feed on a wafer therein and a pair of spikes holds the monitor in place on the surface of the ground. A clear wafer case formed from polyvinyl chloride is welded to the base to protect and secure the wafer from weather damage. A top flap also formed from polyvinyl chloride of an opaque color is affixed to or integrally formed with the base to cover the wafer contained within the transparent wafer case. In the most preferred form of the invention, the flap includes a slot for engaging the head of a spike to retain the flap over the wafer.

In use, once a building owner contracts with a PMP providing the monitoring service, the monitors are attached to the ground around the prescribed building using suitable spikes placed within spike apertures in the base and are driven into the ground by a hammer to anchor the monitor. Next, the flap of each monitor is folded over the top of the wafer case to prevent the effect of the sun and other adverse weather conditions acting on the wafer. Feeding ports allow easy access from beneath for subterranean termites and the ports are designed to keep other insects out that may prohibit termite activity.

During regular inspections, the flap of each monitor is lifted and the wafer visually inspected. If no termite damage has been found, the flap is repositioned atop the wafer. If termite damage is found, then a more detailed inspection of the building is made along with a determination as to appropriate steps to be taken, such as chemically treating the building foundation where termite activity is noted.

This invention is therefore designed to provide property owners with both an assurance program which includes regular inspections and the use of monitors placed in a treatment zone around a building. If subterranean termites are discovered within the treatment zone the PMP will treat such infestation during the coverage period at no additional charge.

Prior to the coverage, the PMP inspects the building according to the contract terms to insure no current termite activity exists as well as noting any visible evidence of damage or conditions conductive to termite attraction. If no termites or undesirable conditions are found which would prohibit coverage, the building can be placed under the assurance contract.

Placement of monitors are used to aid in determining the current effectiveness of any treatment and help in the assessing the termiticide treatments. The building owner also provides the PMP information pertaining to any known termite activity or prior treatment. The PMP then prepares a graph of the covered building and notes any evidence of termites, damage, or other such conditions or concerns. A list of conditions (conductive to termite activity) as within the contract protocols, and correction is required before coverage begins. Corrective measures for the conditions are preformed by the PMP at a predetermined charge at the time of initial inspection. Afterwards, the assurance contract can be entered into and later extended or renewed as dictated by the contract terms. The contract includes protocols to guide the PMP in the art of inspection as well as coverage terms and conditions.

BRIEF DESCRIPTION OF THE DRAWINGS

FIG. 4 demonstrates a side elevational view of the insect monitor as shown in FIG. 1 in a closed bi-folded posture.

FIG. 5 pictures another view of the insect monitor as seen in FIG. 4 showing termite activity.

DETAILED DESCRIPTION OF THE PREFERRED EMBODIMENT AND OPERATION OF THE INVENTION

Figure 1:
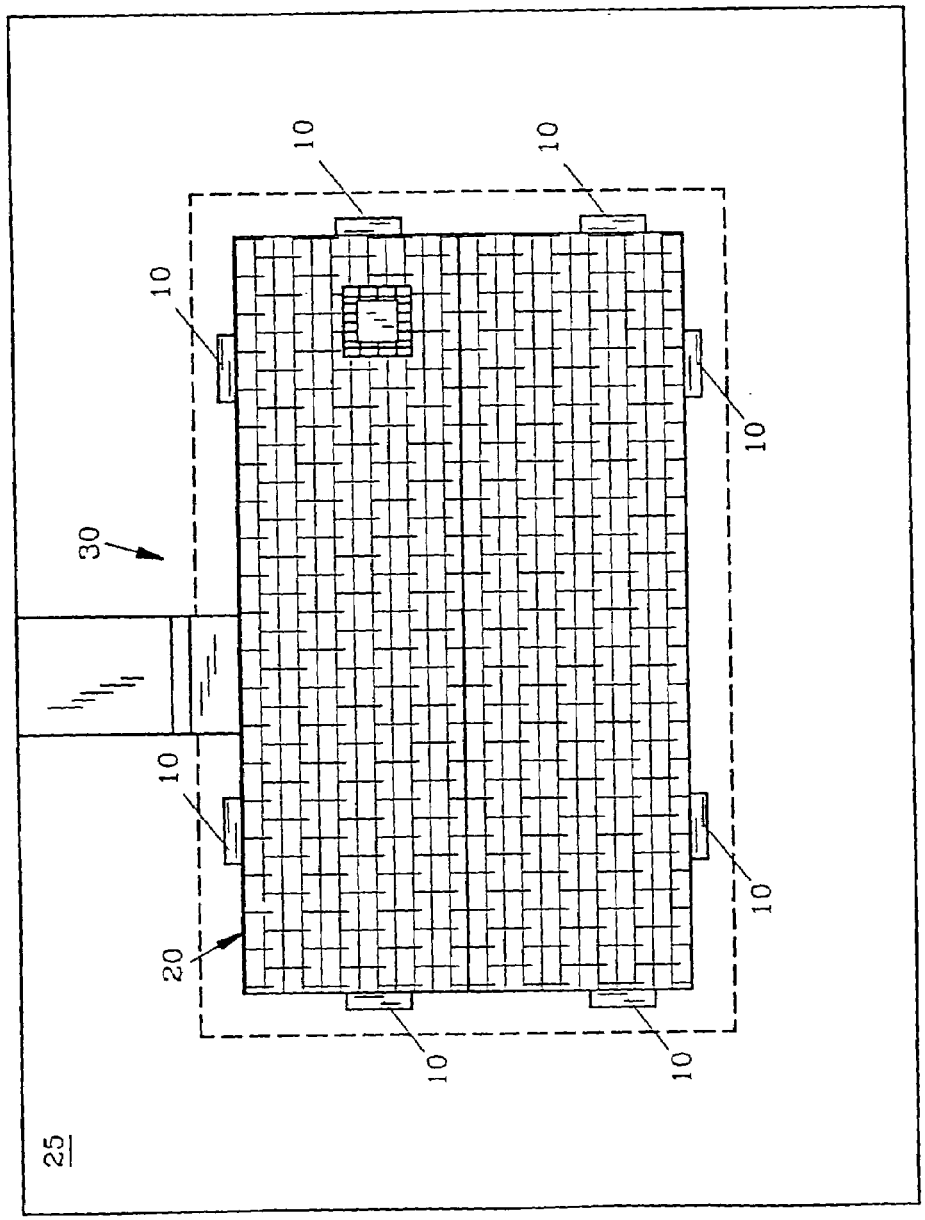
FIG. 1 shows a top plan view of a house with a surrounding insecticide treatment zone seen in dashed line form.

For a better understanding of the invention and its operation, turning now to the drawings, FIG. 1 demonstrates preferred insect monitors 10 positioned around house 20 within termiticide treatment zone 30 which surrounds the foundation of house 20 indicated in dashed line form. Treatment zone 30 extends exteriorly from house 20 approximately six inches (15.24 cm) as is conventional in the trade and in accordance with termiticide labeling requirements. Preferred insect monitors 10 are placed around house 20 at approximately forty feet (12.19 meters) intervals for determining the termite activity threat (as may result from termiticide chemical degradation). Monitors 10 can also be placed within crawl spaces or other areas as desired.

Figure 2:
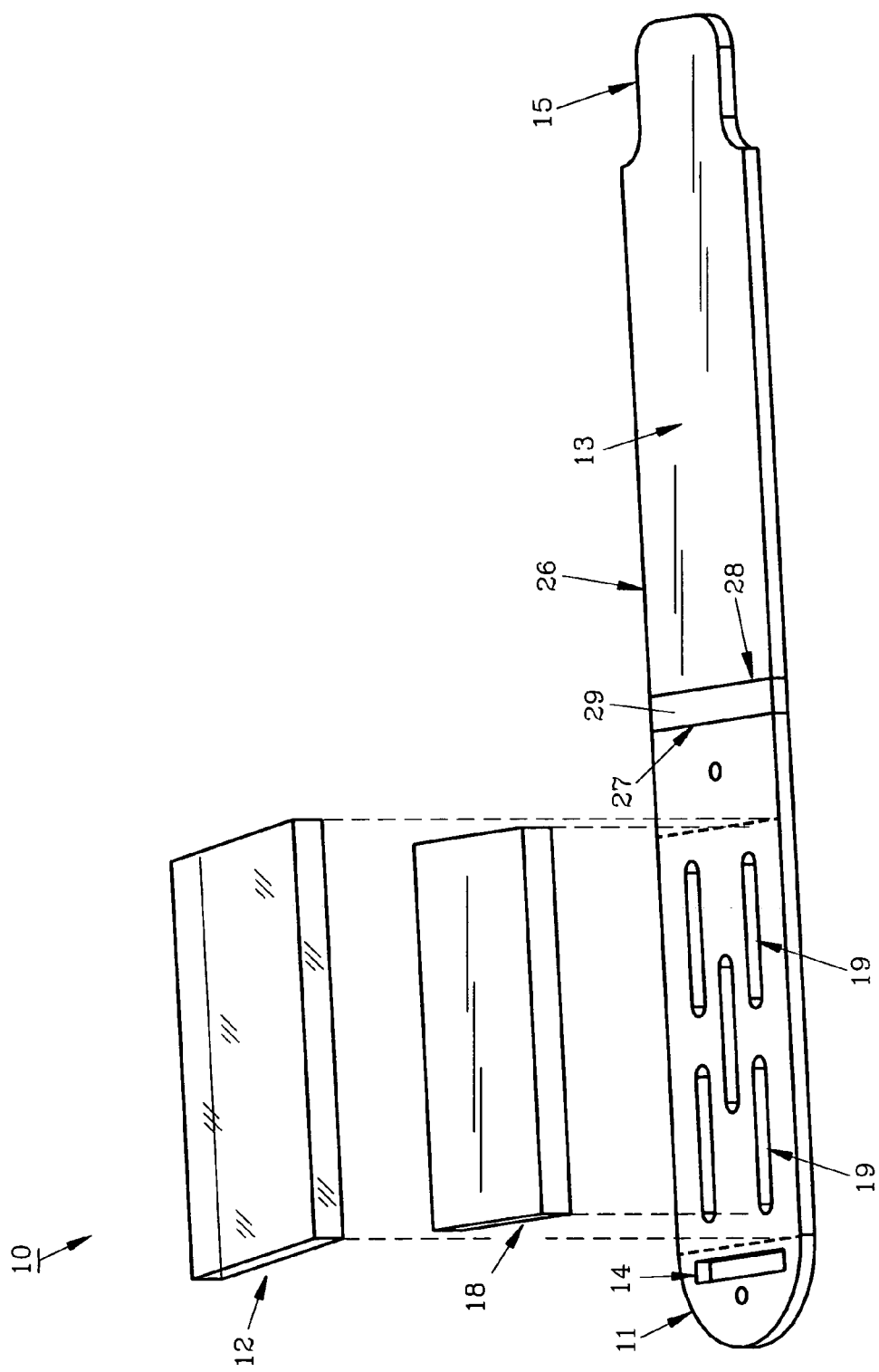
FIG. 2 features a perspective view of the preferred subterranean termite monitor of the invention in exploded fashion.

As seen in FIG. 2, preferred insect monitor 10 (shown in exploded fashion) includes bi-foldable planar body 26 with base 11 having feeding ports 19 formed from a thin (0.79 cm), polymeric material, preferably polyvinyl chloride having a length of approximately seventeen inches (43.18 cm) and a width of approximately 2.5 inches (6.35 cm). Mounted atop base 11 is transparent wafer case 12 likewise formed from polyvinyl chloride. Wafer case 12 has length of approximately 3.5 inches (8.88 cm) and a height of approximately one-half inch (1.25 cm) for receiving wafer 18 which consists of a natural wood block, preferably pine although other woods may be used such as poplar, oak, elm and the like. Bi-foldable planar body 26 includes opaque flap 13 and wall 29 which are integrally formed with base 11 and are bi-foldable along first fold line 27 and second fold line 28 over wafer case 12 and wafer 18 as shown in FIGS. 4 and 5 to protect wafer 18 from the sun and the like. End 15 of flap 13 is narrow to fit within slot 14 of base 11 as seen in FIGS. 2, 3, 4 and 5. Wall 29 is also seen in FIGS. 4 and 5 contiguous wafer case 12 while body 26 is bi-folded with flap 13 parallel to base 11.

Figure 3:
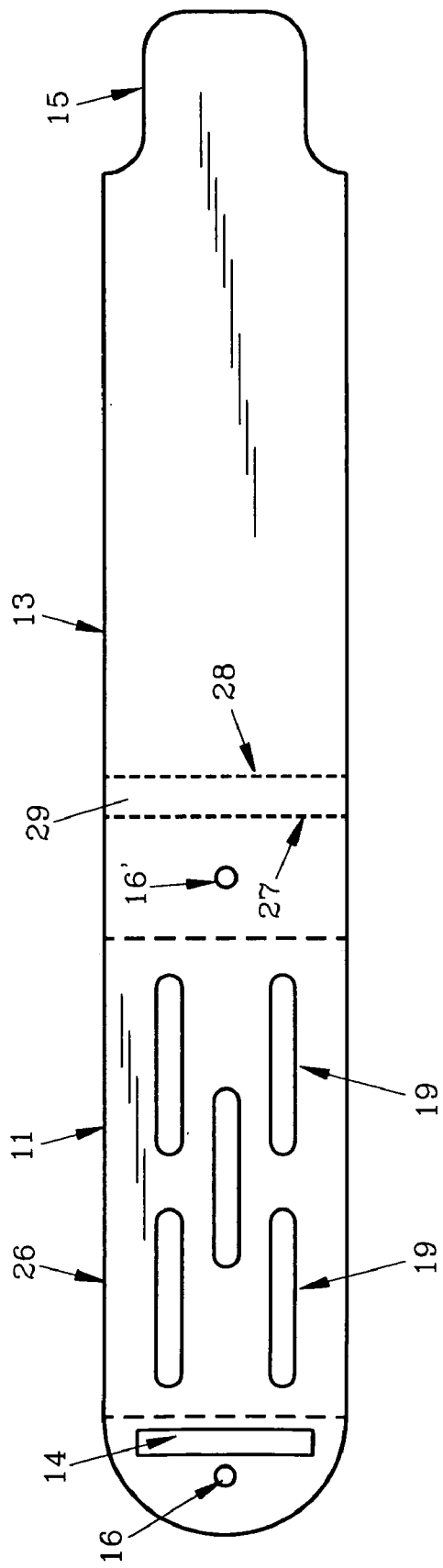
FIG. 3 depicts a top plan view of the base and integral top flap without the wafer case of the insect monitor.

In FIG. 3, base 11 is shown in a top view and illustrates spike apertures 16, 16' which are sized to retain preferably twenty penny (20d) conventional galvanized steel nails, although other pins or spikes may be used. In FIG. 4, insect monitor 10 is seen with spikes 22, 22' which maintains insect monitor 10 in place on the surface of ground 25 as seen in FIG. 1. In FIG. 5, termites 41 have entered feeding ports 19 of base 11 and have consumed part of wafer 18.

In the preferred method of the invention, a PMP contacts a home or building owner and enters into an assurance contract to monitor and control termite infestations to prevent structural damage to the building. Before the contract is entered into, a history of the building regarding insecticide treatments, repairs or the like is first ascertained from the building owner and thereafter an actual inspection by the PMP of the building foundation and surrounding building components and structural elements is made to determine the present status. If the building (such as house 20 in FIG. 1) is in a termite-free, non-damaged state the contract is executed by the parties. Monitors 10 are then placed proximate treatment zone 30 as seen in FIG. 1 at approximately forty foot (12.19 meters) intervals therearound.

Next, in accordance with the terms of the specific contract, annual or other periodic inspections are made by the PMP as set forth therein, whereby each positioned monitor 10 is then opened by lifting flap 13 and wafer 18 is visually inspected through wafer case 12. If no termite infestation or damage is found, flap 13 is replaced over wafer case 12 until the next inspection. However, if termite infestations or activity are found, a more thorough inspection is conducted of house 20 and a determination is made as to how to treat house 20. A written report is given to the building owner describing the remedy required.

Figure 7:
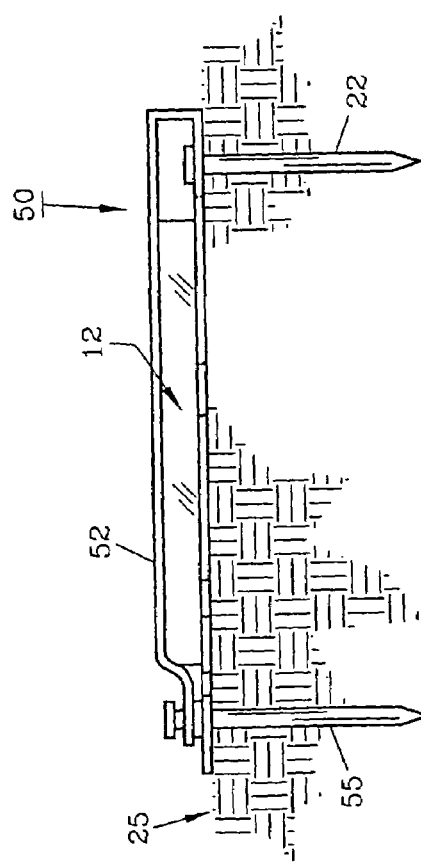
FIG. 7 features a side elevational view of the insect monitor as seen in FIG. 6.
Figure 6:
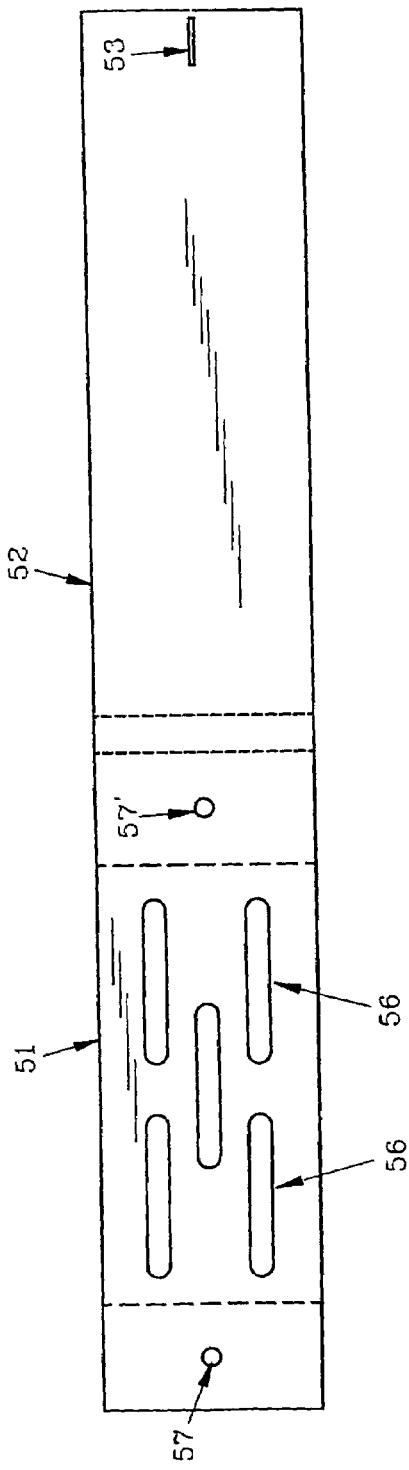
FIG. 6 illustrates a top plan view of the base and the integral top flap of the most preferred form of the insect monitor.

In another form of the insect monitor determined to be the most preferred form, as seen in FIGS. 6 and 7, insect monitor 50 as shown in FIG. 7 includes base 51 formed from a thin polyvinyl chloride material which is integrally formed with top flap 52 defining spike slot 53 which, as shown in FIG. 7 engages dual head spike 55 to secure top flap 52 over wafer case 12. As further seen in FIG. 7, only one dual head spike is required and the rear spike can be a conventional spike 22 nail or the like.

Base 51 includes feeding ports 56 and spike apertures 57, 57'. Thus, insect monitor 50 is used as described for insect monitor 10 except for use of dual head spike 55, which is a standard dual head nail, and spike slot 53 contained in top flap 52.

The illustrations and examples provided herein are for explanatory purposes and are not intended to limit the scope of the appended claims.

What is claimed is:

1. A method of monitoring termite activity in a termiticide zone about a building foundation utilizing a monitor having a bi-foldable flap attached to a base, the base supporting a transparent wafer case, the flap covering the wafer case when the flap is bi-folded over the base, the method of monitoring comprising the steps of:
   a) placing the monitor on the ground in the termiticide zone;
   b) lifting the monitor flap while the monitor base remains on the ground to observe termite activity within the wafer case; and
   c) bi-folding the monitor flap over the wafer case after observation.

2. The method of claim 1 wherein placing the monitor comprises the step of placing a series of monitors spaced from one another and the building foundation within the termiticide zone.

3. The method of claim 2 wherein placing a series of monitors further comprises the step of spacing the monitors at approximately 12 meter intervals.

4. The method of claim 1 further comprises the step of securing the monitor to the ground.

5. The method of claim 1 further comprises the step of defining the termiticide zone about the building foundation.

6. The method of claim 1 wherein placing the monitor comprises the step of placing the monitor within approximately 15 cm of the building foundation.

7. The method of claim 1 wherein lifting the monitor flap comprises the step of observing termite activity through the transparent wafer case.

8. A method of monitoring subterranean termite activity for a building over time during a specified coverage period utilizing a monitor having a bi-foldable polymeric planar body with a base and an opaque flap with a wall between the base and the flap so the base resides substantially parallel to the flap when the body is bi-folded, the base defining a feeding port, a transparent wafer case positioned on the base and surrounding a wafer, the flap preventing adverse effects of the sun from acting on the wafer, the method comprising the steps of:
   a) defining a termiticide treatment zone on the ground surrounding the foundation of the building;
   b) spacing a series of monitors in the termiticide zone apart from the building;
   c) closing the flap of each monitor by first folding the wall along the wafer case and then folding the flap to cover the wafer case so the flap is substantially parallel to the base;
   d) waiting a period of time for occurrence of possible termite activity within the wafer case;
   e) lifting the flap from the wafer case while the base remains on the ground for observing termite activity within each wafer case; and
   f) thereafter closing the monitor by bi-folding the body so the flap covers the wafer case.

9. The method of claim 8 wherein spacing a series of monitors comprises the step of spacing the monitors approximately 12 m apart.

10. The method of claim 8 wherein spacing a series of monitors comprises the step of separately securing each monitor to the ground.

11. The method of claim 8 wherein closing each monitor flap comprises the step of securing the flap to the base.

* * * * *